United States Patent [19]

McMills

[11] Patent Number: 4,655,159

[45] Date of Patent: Apr. 7, 1987

[54] COMPRESSION PRESSURE INDICATOR

[75] Inventor: Corey J. McMills, Los Altos, Calif.

[73] Assignee: Raychem Corp., Menlo Park, Calif.

[21] Appl. No.: 781,386

[22] Filed: Sep. 27, 1985

[51] Int. Cl.4 .............................................. G01L 5/00
[52] U.S. Cl. ...................................... 116/212; 285/93;
  285/249; 285/382.7; 339/177 R; 403/27; 411/8;
  277/2; 277/190
[58] Field of Search ............... 116/212, DIG. 34, 306,
  116/307, 321, 322, 208, 281, 282, 283, 323;
  73/761, 762; 411/8-14; 174/75 C, 88 C; 277/2,
  190, 191, 122, 117, 110, 112, 121; 285/93, 249,
  382.7; 339/177 R, 177 E; 403/27, 342, 370

[56] References Cited

U.S. PATENT DOCUMENTS

| | | | |
|---|---|---|---|
| 2,394,351 | 2/1946 | Wurzburger | 285/382.7 |
| 2,443,635 | 6/1948 | Morris et al. | 200/162 |
| 2,473,118 | 6/1949 | Wolfram | 285/382.7 |
| 2,475,741 | 7/1949 | Goeller | 285/382.7 |
| 2,937,360 | 5/1960 | True | 339/177 R |
| 3,383,974 | 5/1968 | Dahl | 73/761 |
| 4,223,896 | 9/1980 | Strom | 277/207 A |
| 4,375,291 | 3/1983 | Padgett | 277/DIG. 10 |
| 4,548,427 | 10/1985 | Press et al. | 285/93 |

Primary Examiner—Charles Frankfort
Assistant Examiner—W. Morris Worth
Attorney, Agent, or Firm—Dennis E. Kovach; Herbert G. Burkard

[57] ABSTRACT

A compression pressure indicator includes a compression member which is disposed within a termination and is constructed such that when exposed to a pressure above a predetermined pressure a portion of the compression member protrudes from the termination thus indicating that optimum pressure has been applied inside the termination. The compression member includes an indicator portion and a collapsible portion, the collapsible portion being shaped such that when exposed to a pressure above the predetermined pressure, the collapsible portion collapses thus allowing relative movement between the indicator portion and pressure extending member such that the indicator portion protrudes a predetermined distance from an end of the pressure exerting member.

18 Claims, 2 Drawing Figures

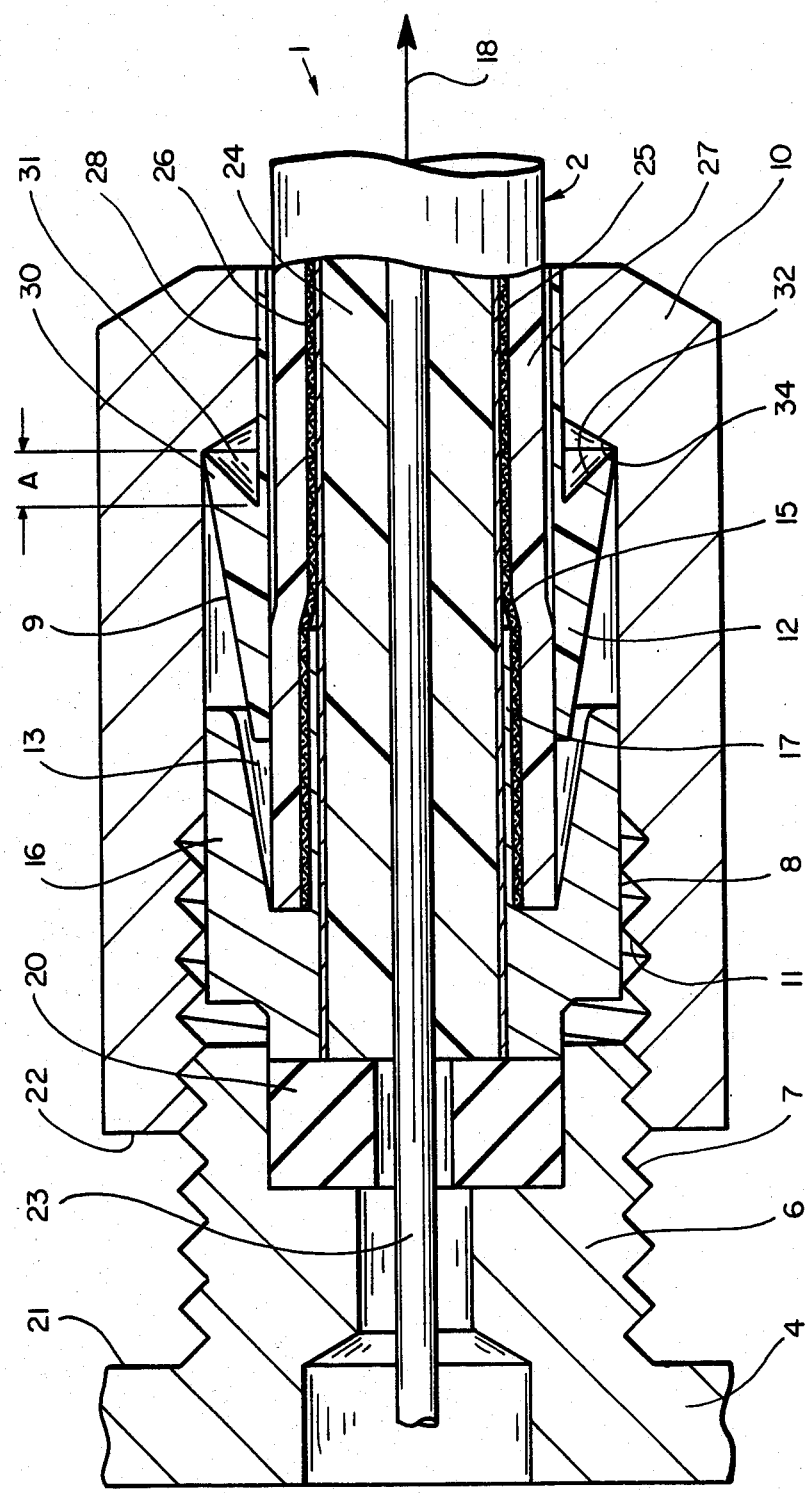
FIG_1

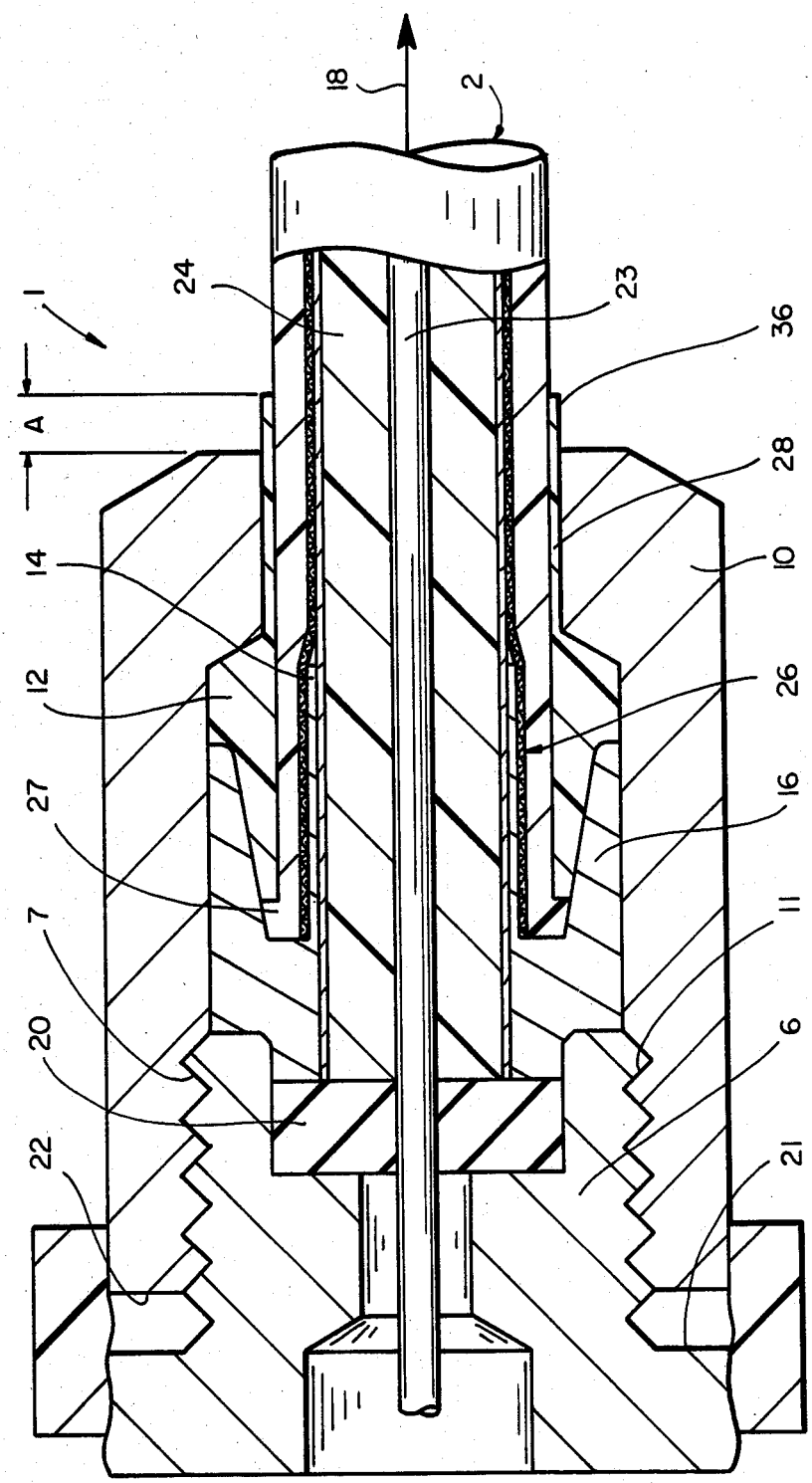
FIG_2

COMPRESSION PRESSURE INDICATOR

BACKGROUND OF THE INVENTION

The present invention relates to a compression pressure indicator for indicating when an optimum amount of torque has been applied to a connection.

Various connections and terminations have been proposed in the art for connectorizing and terminating various elements, such as electrical conductors, one particular example being termination of coaxial cables. A problem exists with prior art terminations and connectors in that when termination is accomplished by screw threading an outer member around an inner nut, oftentimes, due to the mechanical advantage provided to the craftsman by the installation tool he is using, such as a wrench, the craftsman is unable to determine when internal elements of the termination have been subjected to an optimum amount of pressure, or at least an amount of pressure sufficient to insure that various sealing surfaces are sealingly engaged, and accordingly many terminations are improperly applied since the craftsman either undertorques the termination during installation in which case leak paths exist, or the termination is overtorqued resulting in twisting the termination unduly which degrades its electrical performance and oftentimes causes cracks in either the element being terminated or internal parts of the connector itself.

SUMMARY OF THE INVENTION

Accordingly, it is an object of the present invention to eliminate the above-noted drawbacks of prior art terminations, and to provide a simple, efficient, and reliable means for indicating when a connector has been optimally torqued so as to apply an optimum amount of pressure to internal parts of the termination.

These and other objects are achieved by the provision of a compression pressure indicator which includes a compression member having an indicator portion extending from one end thereof, the compression member including a collapsible portion which collapses when subjected to a predetermined amount of pressure which allows a member compressing and exerting pressure on the compression member to move relative to the indicator portion when the collapsible portion colllapses, this movement being visually observable by a craftsman.

BRIEF DESCRIPTION OF THE DRAWINGS

FIG. 1 is a partial cross-sectional view of an embodiment of the present invention used in conjunction with a termination for terminating a coaxial cable, the termination in FIG. 1 being illustrated in an assembled but yet to be torqued state; and FIG. 2 is a partial cross-sectional view of the termination of FIG. 1 in its torqued installed state.

DESCRIPTION OF THE PREFERRED EMBODIMENTS

FIGS. 1 and 2 illustrate one preferred embodiment of the invention wherein the invention is illustrated as part of a termination 1 for a coaxial cable 2 for terminating and connecting the coaxial cable 2 to a mounting block 4 having a mounting nut 6 extending from one end thereof, the nut 6 having external threads 7 thereon. The coaxial cable 2 shown in FIGS. 1 and 2 includes inner EMI shield 25, outer EMI braided shield layer 26, a center conductor 23, an intermediate dielectric layer 24, and an outer jacket 27.

The termination includes a connector body 8, a driver member 10 having internal threads 11 engageable with the external threads 7 of the mounting nut 6, and a compression member 12. The connector body 8 forms a deformation focusing portion 13 substantially conical in shape. The portion 13 is shaped by a substantially uniform hollow cylindrical member 14 having a tapered end 15 for facilitating insertion of the cylindrical member 14 between coaxial cable braided layer 26 and inner coaxial cable shield layer 25, as illustrated, and an outer tapered conical member 16 which surrounds the cylindrical member 14 and provides therewith a volume of space 13 which increases in an axial direction indicated by arrow 18, an inner surface of the member 16 having the conical shape. A washer 20 provides sealing against environmental leakage occurring between threads 7, 11, this functional alternatively being accomplished by a resilient seal disposed across joint 22 between first and second confronting end walls 21, 22 of the mounting nut 6 and driver member 10, respectively (FIG. 2). Though both the seal 19 and washer 20 are illustrated in FIG. 2, if desired only one of these elements can be chosen.

The torque indicator will now be described by example with reference to the compression member 12. The compression member 12 includes an outer surface 9 which is substantially conically shaped and is adapted to be received within the cavity 13. The compression member 12 further includes an indicator portion 28 which is disposed between the cable 2, specifically its jacket 28, and the drive member 10. Clearances between the indicator portion 28 and the jacket 27 and member 28 have been exaggerated in the Figures for ease of illustration. The compression member 12 further includes a collapsible portion 30 having a profile such that when exposed to a predetermined critical pressure, the portion 30 deforms and collapses rather rapidly in the axial direction. In the embodiment illustrated, the portion 30 has a conical shape, being substantially triangular in cross-section, such that material can flow into void or channel 31 defined by the portion 30, indicator portion 28, and compression surface 34 of the driver member 10.

The compression member 12 is made of a material (e.g. plastic) which is softer than a material from which the driver member 10 and the connector body 8 are made (e.g. metal), and hence when the compression member 12 is pressurized between the driver member 10 and the connector body 8, the compression member 12 deforms rather than the connector body 8 or the driver member 10. The primary function of the compression member 12 is to provide a seal between the cable jacket 27 and the driver member 10, when focused and compressed as illustrated in FIG. 2.

Since an angle of slant of an inner conical surface 32 of the collapsible portion 30 is opposite that of an angle of slant of the compression surface 34 of the driver member 10, when the collapsible portion 30 collapses, to a first approximation, the compression member 12 moves relative to the driver member 10 by distance A, as visually illustrated by comparing FIGS. 1 and 2.

The use and operation of the invention will be more specifically described by reference to the changes in states between FIGS. 1 and 2, with FIG. 1 showing an assembled but yet to be completely installed state of the termination 1, with FIG. 2 showing the completely installed state of the termination 1. In FIG. 1, it can be seen that the driver member 10 has been threaded around the nut 6 rather loosely such that the compression surface 34 is in initial contact with the compression surface 32 of the collapsible portion 30. By turning the driver member 10 around the nut 6, movement of the driver member 10 axially in a direction opposite the arrow 18 is effected which causes the compression member 12 to similarly move axially in a direction opposite that of the arrow 18. The axial movement of the compression member 12 continues until it lands within the cavity 13 at which time further movement of the driver member 10 causes portions of the compression member 12 to deform until substantially all voids within the deformation focusing cavity 13 have been filled and the cable jacket 27 has been placed under a predetermined pressure. Up to this point, minimal relative movement between the driver member 10 and the indicator portion 28 occurs since the collapsible portion 30 of the compression member 12 has only been slightly deformed due to the pressure exerted by the driver member 10, but has not yet collapsed. Further tightening of the driver member 10 around the thread 7 of the nut 6 further increases the pressure on the compression member 12 up to a point where the collapsible portion 30 collapses rather rapidly which causes the compression member to move in the direction of the arrow 18 and relative to the driving member 10 the predetermined distance A. At this time, the craftsman observes the exposed portion 36 of the indicator portion 28 around the cable 2 and discontinues turning the driver member 10 around the nut 6.

By appropriately choosing the material formulation of the compression member 12, and specifically the collapsible portion 30 thereof, it is possible to precisely control the pressure which is required to crush the collapsible portion 30 and achieve the desired movement of the indicator portion relative to the driving member, with the result that the indicator portion 28 essentially "pops out" of the backend of the termination when this predetermined pressure has been exceeded. Hence, by choosing this predetermined pressure to be within a range of optimum pressures for use in installing the termination 1 such that the compression member 12 is adequately deformed to seal against all leakage paths coming from an end of the coaxial cable, and such that the washer 20 if used also is sufficiently compressed, it can readily be seen that an easy, efficient, and very reliable means is provided for informing a craftsman when an optimum amount of pressure has been exerted onto internal parts of the termination 1, which internal parts are generally hidden from view from the craftsman. One experiment done resulted in collapsible at 600 lb/in$^2$, and an excellent connection resulted.

Though the invention has been described with reference to one preferred embodiment thereof for use with a termination for terminating a coaxial cable, it can readily be seen that the invention is useable with many other types of terminations and connectors wherein it is desired to determine when a predetermined pressure has been exerted on internal parts of the termination or connector, and accordingly the invention is not intended to be limited to only the embodiment described above, and is to be limited only by the appended claims.

What is claimed is:

1. A compression pressure indicator, comprising:
   a compression member;
   means for exerting pressure on the compression member in an axial direction;
   the compression member being made of a material adapted to be deformed when subjected to pressure to form a seal between surfaces formed by the pressure means in contact with said compression member, the compression member including an indication portion extending from one end thereof and further including a collapsible portion adapted to receive pressure axially from one portion of the pressure means, said pressure means completely surrounding the compression member, the collapsible portion and the indication portion being constructed so as to form a V-shaped channel therebetween, the collapsible portion upon being subjected to a predetermined excessive pressure by said pressure means collapses allowing the compression member to move and fill the V-shaped channel such that at least part of the indication portion is urged out of the pressure means to provide a visual indication that further pressure is not required.

2. The compression pressure indicator of claim 1, further comprising means for focusing deformation of the compression member.

3. The compression pressure indicator of claim 2, wherein the compression member, the focusing means, and the pressure means each has a ring-type shape.

4. The compression pressure indicator of claim 3, wherein the indicator portion of the compression member is disposed adjacent an inner ring surface of said portion of the pressure means.

5. The compression pressure indicator of claim 4, wherein the pressure means comprises a driver member engageable with a mounting member.

6. The compression indicator of claim 1, wherein the collapsible portion has a cross-sectional profile such that upon collapsing a longitudinal length of the collapsible portion significantly decreases while a longitudinal length of the compression member significantly increases so as to allow the indication portion to move a significant distance relative to the pressure means and extent outward from a back end of the pressure means.

7. The compression pressure indicator of claim 6, further comprising means for focusing deformation of the compression member, the focusing means, the pressure means, and the compression member being disposed about an end of a coaxial cable, and the indication portion being disposed between an outer jacket of the cable and an inner surface of said portion of the pressure means.

8. The compression pressure indicator of claim 6, wherein the collapsible portion has a tapering V-shaped cross-section.

9. The compression pressure indicator of claim 6, wherein the compression member forms an environmental seal when deformed.

10. A termination, comprising:
    a compression member;
    means for focusing deformation of the compression member; and
    means for axially driving the compression member against the focusing means so as to deform the compression member;
    the compression member having a ring-type shape and having an indicator portion at one end thereof, the driving means having a ring-type shape and having an internal diameter on a portion thereof large enough to allow at least part of the indicator portion to be concentrically disposed within the driving means so as to allow the indicator portion to extend therefrom, the compression member having a collapsible portion therein having a strength less than that of the focusing means and said portion of the driving means, the collapsible portion and the indicator portion being constructed so as to form a V-shaped channel therebetween such that when the compression member is pressurized beyond a predetermined amount by movement of the driving means toward the focusing means the collapsible portion collapses against the driving means allowing the compression member to move and thereby fill the V-shaped channel and cause the indicator portion to move at least partially outside of said portion of the driving means.

11. The termination of claim 10, wherein the focusing means has a ring-type shape.

12. The termination of claim 11, wherein the indicator portion is disposed adjacent an inner ring surface of the driving means.

13. The termination of claim 12, further comprising a mating member engageage with the driving means.

14. The termination of claim 11, wherein the collapsible portion has a cross-sectional profile such that upon collapsing a longitudinal length of the collapsible portion significantly decreases while a longitudinal length of the compression member significantly increases so as to allow the indicator portion to move a significant distance relative to said portion of the driving means and extend outward therefrom.

15. The termination of claim 14, wherein the focusing means, compression member, and the driving means are disposed about an end of a coaxial cable, the indicator portion being disposed between an outer jacket of the cable and an inner surface of the driving means.

16. The termination of claim 10, wherein the collapsible portion has a tapering cross-section.

17. The termination of claim 16, wherein the tapering cross-section is substantially V-shaped.

18. The termination of claim 10, wherein the collapsible portion is made of a material and being shaped such that it substantially collapses when pressurized above a predetermined pressure.

* * * * *